(12) United States Patent
Dagan et al.

(10) Patent No.: US 12,056,358 B2
(45) Date of Patent: Aug. 6, 2024

(54) PREDICTING STORAGE ARRAY RESPONSE TIMES

(71) Applicant: Dell Products L.P., Round Rock, TX (US)

(72) Inventors: Hagay Dagan, Pardes Hanna (IL); Ron Arnan, Nes Ziona (IL); Gil Ratsaby, Jerusalem (IL)

(73) Assignee: Dell Products L.P., Round Rock, TX (US)

( * ) Notice: Subject to any disclaimer, the term of this patent is extended or adjusted under 35 U.S.C. 154(b) by 32 days.

(21) Appl. No.: 17/975,660

(22) Filed: Oct. 28, 2022

(65) Prior Publication Data

US 2024/0143175 A1 May 2, 2024

(51) Int. Cl.
*G06F 3/06* (2006.01)
*G06F 11/34* (2006.01)

(52) U.S. Cl.
CPC .......... *G06F 3/0611* (2013.01); *G06F 3/0665* (2013.01); *G06F 3/067* (2013.01); *G06F 11/3447* (2013.01)

(58) Field of Classification Search
CPC ...... G06F 3/0611; G06F 3/0665; G06F 3/067; G06F 11/3447

USPC .................................................. 711/154, 100
See application file for complete search history.

(56) References Cited

U.S. PATENT DOCUMENTS 9,703,664 B1 * 7/2017 Alshawabkeh ......... G06F 3/067
10,282,107 B1 * 5/2019 Martin .................. G06F 3/0689

* cited by examiner

*Primary Examiner* — David Yi
*Assistant Examiner* — Zubair Ahmed
(74) *Attorney, Agent, or Firm* — Krishnendu Gupta; Nikhil Patel

(57) ABSTRACT

One or more aspects of the present disclosure relate to predicting one or more performance metrics of a storage array configuration. In embodiments, a storage array configuration can be generated based on one or more array-configuration related parameters. In addition, IO workload metrics corresponding to an IO workload received by an array corresponding to the storage array configuration can be recorded. Further, at least one response time (RT) prediction can be generated based on the IO workload metrics. Accordingly, another storage array configuration can be generated based on the RT predictions and according to performance requirements defined by a service level objective (SLO).

18 Claims, 4 Drawing Sheets

PREDICTING STORAGE ARRAY RESPONSE TIMES

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

In aspects of the present disclosure, a method includes generating a storage array configuration based on one or more array-configuration-related parameters, recording IO workload metrics corresponding to an IO workload received by an array corresponding to the storage array configuration, generating at least one response time (RT) prediction based on the IO workload metrics, and generating another storage array configuration based on the at least one RT prediction and according to performance requirements defined by a service level objective (SLO).

In embodiments, the method can further include generating a virtual storage array based on the storage array configuration, obtaining one or more sample IO workloads with measured RT results from a physical storage array having a deployed configuration similar to the virtual storage array's configuration, determining workload types of the one or more sample IO workloads.

In embodiments, the method can further include generating the IO workload using one or more sample IO workloads, processing the IO workload using the virtual storage array, and identifying the IO workload's maximum IOs per second (IOPS). In addition, the method can further include analyzing one or more of the IO workload's IO requests.

In embodiments, the method can further include determining at least one or more IO types, IO sizes, and IO compression states corresponding to the IO workload's IO requests.

In embodiments, the method can further include determining a current IOPS and related metrics of the IO workload.

In embodiments, the method can further include analyzing the IO workload's IO types, IO sizes, and IO compression states, determining a workload type of the IO workload, measuring a current RT of the IO workload based on results of the analysis and workload type, where determining the current RT includes using an inverse distance weighting interpolation (IDW) engine to process the analysis results and workload type.

In embodiments, the method can further include measuring the current RT when the IO workload's current IOPS reaches one or more threshold percentiles of the IO workload's maximum IOPS.

In embodiments, the method can further include predicting RTs corresponding to one or more anticipated IO workloads for one or more storage array hardware configurations based on one or more current RT measurements.

In embodiments, the method can further include determining an IOPS growth factor based on the IO workload metrics, type, and IO workload analysis and determining the IO workload's current IOPS percentile of its maximum IOPS using the IOPS growth factor.

In embodiments, the method can include determining the IOPS that causes one or more of the storage array's components to reach 100% utilization.

In aspects of the present disclosure, a system with a processor and memory is configured to generate a storage array configuration based on one or more array-configuration-related parameters, record IO workload metrics corresponding to an IO workload received by an array corresponding to the storage array configuration, generate at least one response time (RT) prediction based on the IO workload metrics, and generate another storage array configuration based on the at least one RT prediction and according to performance requirements defined by a service level objective (SLO).

In embodiments, the system can be further configured to generate a virtual storage array based on the storage array configuration and obtain one or more sample IO workloads with measured RT results from a physical storage array having a deployed configuration similar to the virtual storage array's configuration, determine workload types of the one or more sample IO workloads.

In embodiments, the system can be further configured to generate the IO workload using one or more sample IO workloads, process the IO workload using the virtual storage array, and identify the IO workload's maximum IOs per second (IOPS). Additionally, the system can analyze one or more of the IO workload's IO requests.

In embodiments, the system can be further configured to determine at least one or more IO types, IO sizes, and IO compression states corresponding to the IO workload's IO requests.

In embodiments, the system can be further configured to determine a current IOPS and related metrics of the IO workload.

In embodiments, the system can be further configured to analyze the IO workload's IO types, IO sizes, and IO compression states, determine a workload type of the IO workload, measure a current RT of the IO workload based on results of the analysis and workload type, where determining the current RT includes using an inverse distance weighting interpolation (IDW) engine to process the analysis results and workload type.

In embodiments, the system can be further configured to measure the current RT when the IO workload's current IOPS reaches one or more threshold percentiles of the IO workload's maximum IOPS.

In embodiments, the system can be further configured to predict RTs corresponding to one or more anticipated IO workloads for one or more storage array hardware configurations based on one or more current RT measurements.

In embodiments, the system can be further configured to determine an IOPS growth factor based on the IO workload metrics, type, and IO workload analysis and determine the IO workload's current IOPS percentile of its maximum IOPS using the IOPS growth factor.

In embodiments, the system can be further configured to determine when one or more of the storage array's components reach 100% utilization.

Other technical features can be readily apparent to one skilled in the art from the following figures, descriptions, and claims.

Other technical features can be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. These companies often use storage arrays to store and manage the data. Because a business can configure a storage array with multiple storage devices (e.g., hard-disk drives (HDDs) or solid-state drives (SSDs)), a company can scale (e.g., increase or decrease) and manage an array's storage capacity more efficiently compared to a server. In addition, a company can use a storage array to read/write data required by one or more business applications. Accordingly, a company must ensure its storage array is configured with hardware that can satisfy the company's anticipated input/output (IO) workloads (e.g., data read/write requests).

Embodiments of the present disclosure include estimating response times of potential storage array configurations. For example, the embodiments can include generating a virtual storage array using one or more configuration parameters. Further, the embodiments can record the virtual storage array's performance in response to processing mock IO workloads. Based on the recorded performance, the embodiments can predict the virtual storage array's response times (RTs). Thus, the company can determine whether a particular storage array configuration can satisfy its requirements.

Figure 1:
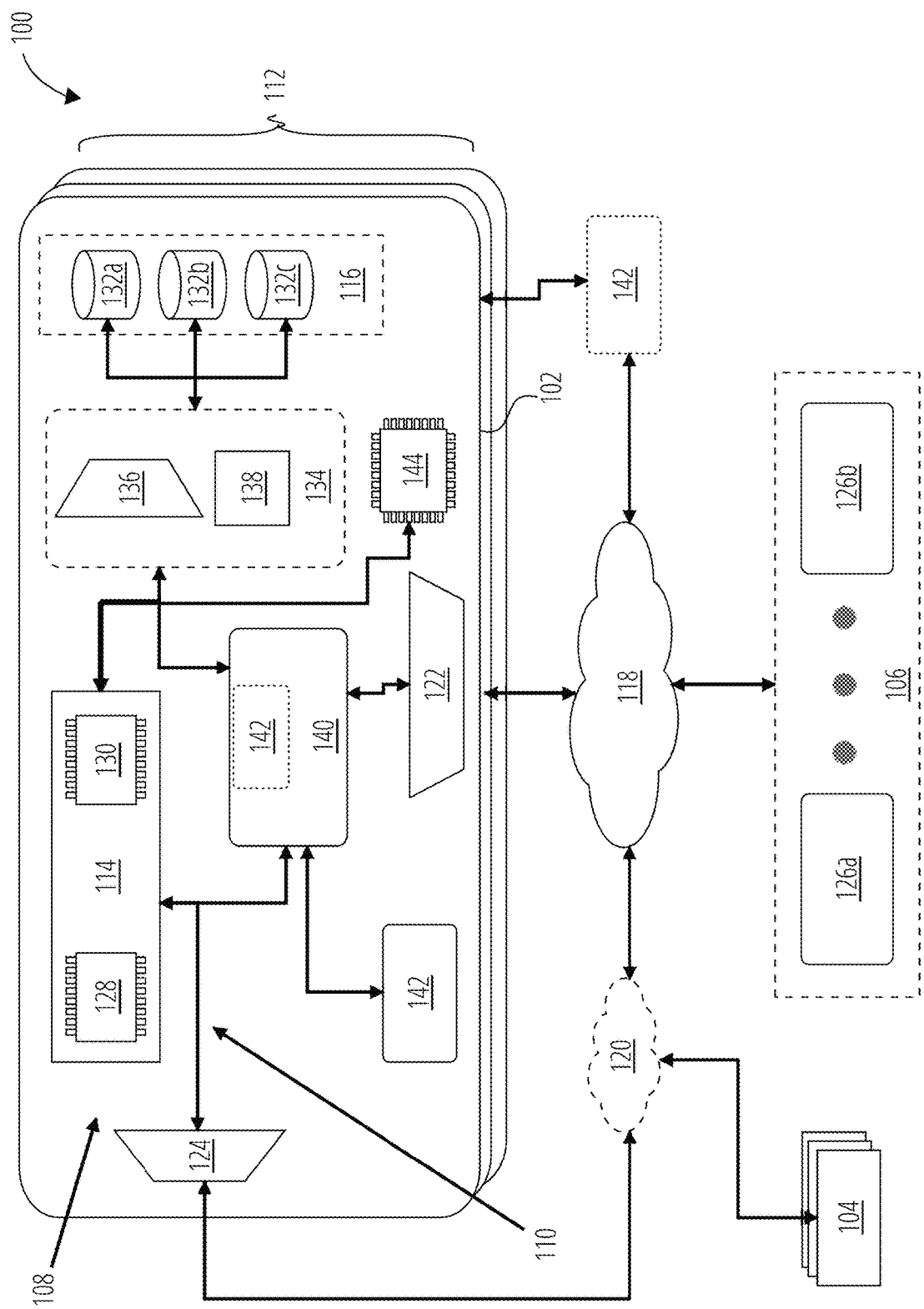
FIG. 1 shows a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112 that includes two or more storage arrays, including the storage array 102.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-b, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processor(s) can execute to perform one or more storage-related services. In addition, the storage array 102 can deliver its distributed storage services using persistent storage 116. For example, the persistent storage 116 can include multiple thin-data devices (TDATs) such as persistent storage drives 132a-c. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a device adapter (DA 136) (e.g., storage device controller), flash drive interface 138, and the like that controls access to the array's persistent storage 116 (e.g., storage devices 132a-c).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-b) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 or its components 108. When external from the storage array 102, the controller 142 can communicate with the storage array 102 using any known communication connections. The communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, storage, and memory resources as described in greater detail herein.

Figure 2:
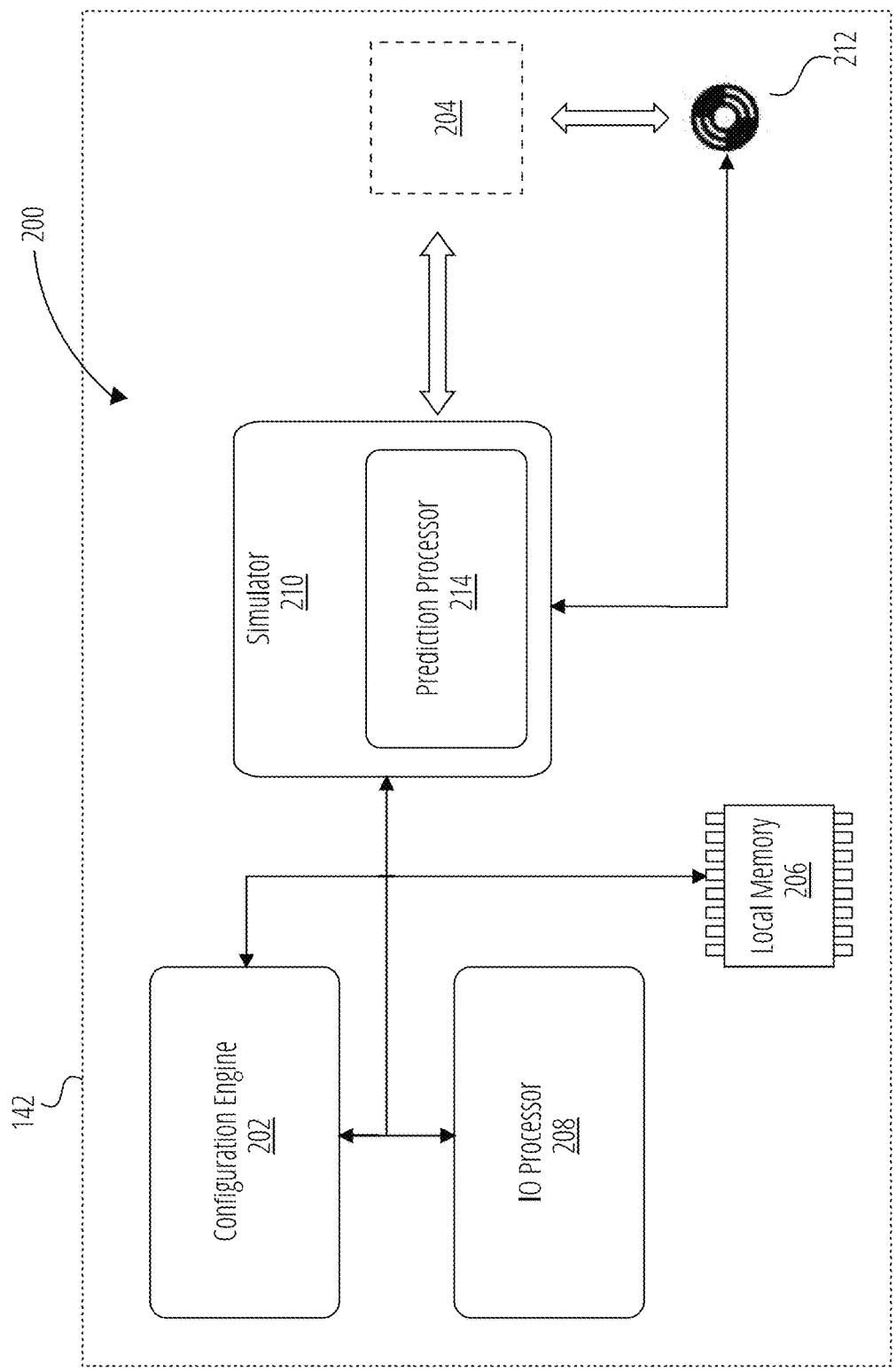
FIG. 2 is a block diagram of a controller in accordance with embodiments of the present disclosure.

Regarding FIG. 2, the controller 142 can include hardware, circuitry, memory, and logical elements 200 that perform one or more services. Further, the elements 200 can include a CPU (central processing unit), GPU (graphical processing unit), parallel processors, and the like. In embodiments, the controller 142 can include a configuration engine 202 that receives storage array configuration data from a host (e.g., client machine 126a). For example, the configuration data can include parameters related to the storage array's physical architecture (e.g., processors, memory, storage drives, cache, and other hardware and circuitry elements). Further, the configuration engine 202 can parse the configuration data to generate a virtual storage array 204 configured with virtual resources defined by the configuration data.

In embodiments, the configuration engine 202 can generate a graphical user interface (GUI) that includes selectable configuration options. Further, the configuration engine 202 can configure the GUI for server-side rendering (SSR) to dynamically render the selectable configuration options based on any additions, updates, or removals from a searchable data structure that includes a list of the configuration options and other related metadata. For instance, the controller 142 can store the searchable data structure in its local memory (LM 206).

In embodiments, the configuration data can also define one or more anticipated IO workloads to receive by a storage array (configured according to the configuration data). For example, the configuration data can define each anticipated IO workload's characteristics. The characteristics can define IO sizes, counts, and compression ratios for one or more IO dimensions of an IO workload. The IO dimensions can include random read hits (RRHs), random read misses (RRMs), random write hits (RWHs), random write misses (RWMs), sequential reads (SRs), sequential writes (SWs), sequential read hits (SRHs), sequential read misses (SRMs), sequential write hits (SWHs), and sequential write misses (SWMs). Thus, the GUI can also include selectable fields enabling a host to define the IO sizes, counts, and compression rations for each anticipated IO workload's workload dimensions In embodiments, the configuration engine 202 can also identify field-deployed or lab-deployed storage arrays having a configuration substantially similar to the virtual storage array 204. For example, the configuration engine 202 can search a searchable data structure in its LM 206 that includes a list of field-deployed or lab-deployed storage arrays. Specifically, the configuration engine 202 can identify the best match using a multi-parameter relational-division technique. In addition, the configuration engine 202 can also cache historical search results to identify the best match. For instance, the historical search results can identify the searched configuration data, the best-matching storage array, and corresponding workload test results.

In embodiments, the controller 142 can include an IO processor 208 that generates one or more sample IO workloads having distinct workload types. Each workload type defines the percent IO requests for each IO dimension. For instance, an example sample IO workload can define a 100% RRH IO workload (i.e., each IO request of the workload is an RRH). Further, another sample IO workload can define an IO workload with 100% of its IO requests corresponding to any given IO dimension. In addition, another example sample IO workload can define an IO workload having a mixed percent of IO requests corresponding to one or more of the IO dimensions. Further, each example sample IO workload can define distinct sizes and compression ratios of its IO requests.

In embodiments, the IO processor 208 can search for IO workloads previously processed by the best-matching storage array that are substantially similar to one or more of the anticipated IO workloads. For instance, the LM 206 can include a searchable data structure that maps the field-deployed and lab-deployed storage arrays to previously processed IO workloads.

To identify the best-matching field-deployed or lab-deployed storage array, the IO processor 208 can obtain the best-matching storage array's processing metrics corresponding to each sample IO workload. The processing metrics can define a sample IO workload's maximum IOs per second (IOPS) and corresponding performance metrics of the best-matching storage array or its components (e.g., components 108 of FIG. 1). For example, the processing metrics can define the maximum IOPS of the sample IO workload, as a whole and per IO dimension. In addition, the performance metrics can define the best-matching storage array's response times (RTs) corresponding per sample IO workload, as a whole, and per IO dimension of each sample IO workload.

In embodiments, the IO processor 208 can generate one or more sample IO workloads substantially similar to the anticipated IO workloads. Accordingly, the IO processor 208 can issue the generated sample IO workloads to the best-matching storage array for processing. Thus, the IO processor 208 can obtain the best-matching storage array's processing metrics corresponding to the generated sample IO workloads.

In embodiments, the controller 142 can include a simulator 210 having hardware, circuitry, and logical elements configured to simulate the processing of IO workloads by a virtual storage array (e.g., virtual storage array 204). For example, the simulator 210 can use the virtual storage array 204 and the anticipated IO workloads to run simulations. During each simulation, the simulator 210 can record the processing and performance metrics of the virtual storage array 204. For example, simulator 210 can establish at least one daemon 212 and communicatively couple it to the virtual storage array 204 and its virtual components (e.g., virtual emulations of the components 108 of FIG. 1). The daemon 212 can record the activity of the virtual components in an activity log. Thus, the simulator 210 can parse the activity log to generate a dimensional results report for each processed sample IO workload. The dimensional results report defines workload processing results (e.g., the processing and performance metrics) of the sample IO workloads per IO dimension.

Additionally, the dimensional results reports define an IO request composition of the anticipated IO workloads per IO dimension. The IO request composition defines the percentage of an IO workload's IO requests corresponding to each IO dimension. For example, the dimensional results reports can define a subject anticipated IO workload as having 40% RRHs and 60% RWMs.

In embodiments, the simulator 210 can include a prediction processor 214 having hardware, circuitry, and logical elements designed to perform IDW (inverse distance weighting interpolation). For example, prediction processors can analyze the dimensional results report to determine the maximum IOPS of the virtual storage array 204 and its components, where the maximum IOPS defines a state of full (e.g., 100%) utilization. Specifically, the prediction processor 214 can identify simulated maximum IOPS corresponding to the virtual storage array 204 and its components. The prediction processor 214 can determine the simulated maximum IOPS based on a relationship between the virtual storage array 204 and the best-matching storage array and between the anticipated IO workloads and sample IO workloads. For example, the prediction processor 214 can use measured maximum IOPS of the best-matching storage array and its components corresponding to each sample IO workload. Accordingly, the prediction processor 214 can define the simulated maximum IOPS (e.g., max IOPS) as a function of one or more of the measured maximum IOPS, the configuration data, anticipated IO workloads, and sample IO workloads.

Further, the prediction processor 214 can generate an IOPS growth factor corresponding to the virtual storage array 204 and each of its components. The IOPS growth factor defines the smallest multiplier of a subject IO workload (e.g., during one or more segment intervals) that causes a storage array or its components to reach full (e.g., 100%) utilization. For example, an IO workload's segment interval corresponds to an IO workload's set of IO requests received by the storage array at a specific point/window of time. Further, the prediction processor 214 can determine the IOPS growth factor using the dimensional results report to identify the IO sizes and compression ratios of the set of IO requests.

In embodiments, the prediction processor 214 can determine a percentile IOPS of a subject anticipated IO workload as a whole or at one or more of the subject anticipated IO workload's segment intervals (e.g., sample IOPS). In addition, the prediction processor 214 can determine the percentile IOPS per IO dimension of the subject anticipated IO workload or the subject anticipated IO workload as a whole. For example, the prediction processor 214 can determine the percentile IOPS according to the following equation.

$$(\text{sample IOPS/max IOPS})*100 \quad (\text{EQ. 1})$$

In embodiments, the prediction processor 214 can determine the distance between the subject anticipated IO workload's percentile IOPS and the substantially similar sample IO workload's percentile IOPS. For example, the prediction processor can perform IDW interpolation using the IO request compositions of the subject anticipated IO workload's percentile IOPS and corresponding IO request compositions of the substantially similar sample IO workload's percentile IOPS. Further, the prediction processor 214 can apply a weight to each of the subject anticipated IO workload's percentile IOPS based on their respective distance from their corresponding percentile IOPS of the substantially similar sample IO workload. For example, the prediction processor 214 can determine each percentile IOPS' weight according to the following equation.

$$(1/\text{distance}) \quad (\text{EQ. 2})$$

In embodiments, the prediction processor 214 can predict RTs of the virtual storage array 204 processing of the subject anticipated IO workload as a function of the calculated weights and measured RT of the best-matching storage array's processing of the substantially similar IO workload. Further, using the predicted RTs, the prediction processor 214 can generate a modified storage array configuration that will likely achieve RTs closer to RTs defined in the storage array configuration data.

The following text includes details of one or more methods or flow diagrams in accordance with this disclosure. For simplicity of explanation, each method is depicted and described as a series of acts. However, each act can occur in various orders or concurrently with other acts not presented and described herein. Furthermore, not all illustrated acts can be required to implement each method described by this disclosure.

Figure 3:
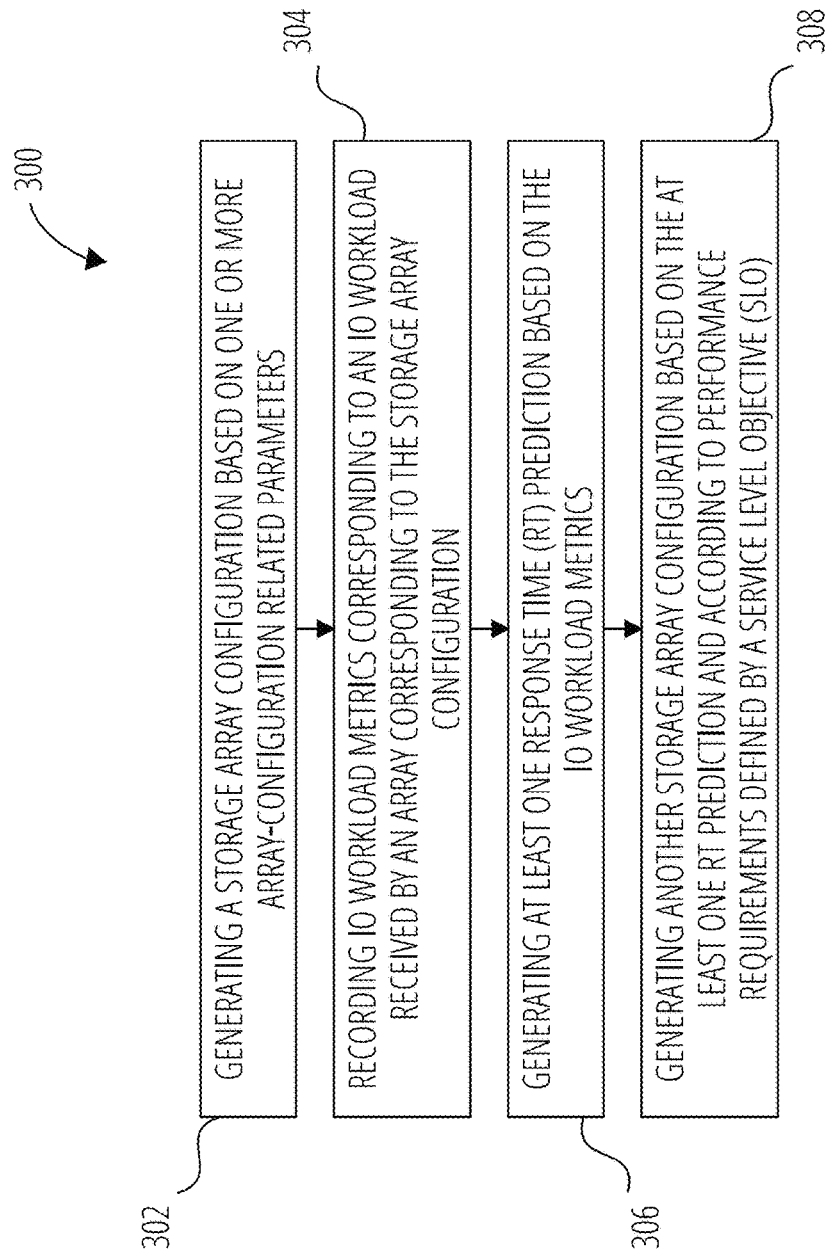
FIG. 3 shows an example method for generating a storage array configuration in accordance with embodiments of the present disclosure.

Regarding FIG. 3, an example method 300 depicts an alterable set of operations related to generating a storage array configuration. In embodiments, one or more of the array's components 108 can execute one or more operations of the method 300. For example, at 302, method 300 can include generating a storage array configuration based on one or more array-configuration-related parameters. Additionally, at 304, method 300 can include recording IO workload metrics corresponding to an IO workload received by an array corresponding to the storage array configuration. Further, the method 300, at 306, can include generating at least one response time (RT) prediction based on the IO workload metrics. In addition, the method 300, at 308, can also include generating another storage array configuration based on the RT prediction and according to performance requirements defined by a service level objective (SLO).

Moreover, each method step can also include any combination of techniques implemented by the embodiments described herein. For example, some of the operations depicted can be performed in parallel or in a different sequence that does not materially affect the function of method 300. In other examples, different components of the storage array 102 can implement one or more operations of the method 300 at substantially the same time or in a specific sequence.

Figure 4:
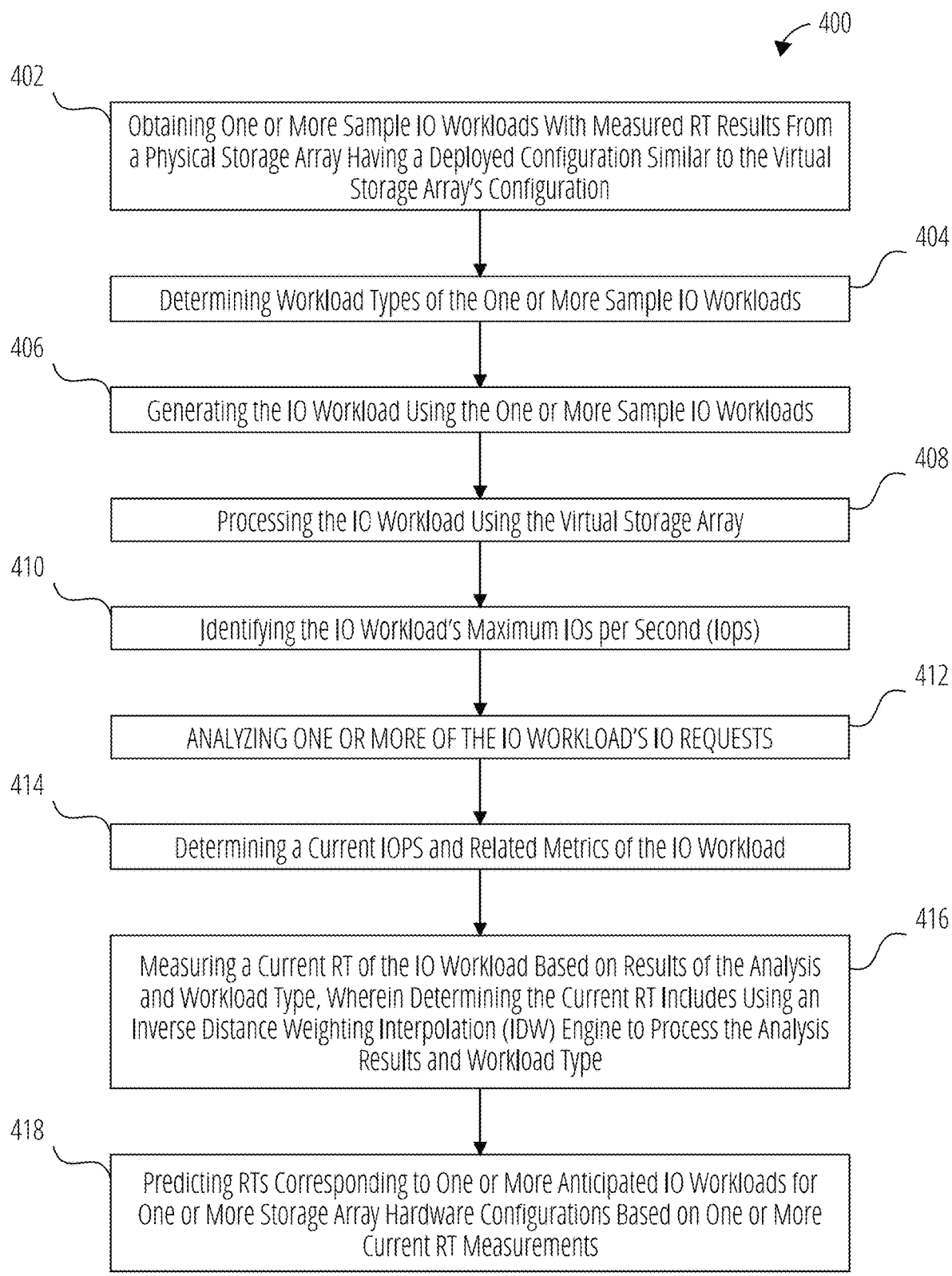
FIG. 4 shows an example method for predicting the performance of a storage array configuration in accordance with embodiments of the present disclosure.

Regarding FIG. 4, an example method 400 depicts an alterable set of operations related to predicting the performance of a storage array configuration. In embodiments, one or more of the array's components 108 can execute one or more operations of the method 400. For example, the method 400, at 402, can include obtaining one or more sample IO workloads with measured RT results from a physical storage array. The storage array can have a deployed configuration similar to the virtual storage array's configuration. For example, the IO processor 208 of FIG. 2 can obtain one or more sample IO workloads with measured RT results from a physical storage array having a deployed configuration similar to the virtual storage array's configuration. At 404, the method 400 can include determining workload types of the one or more sample IO workloads. For example, the IO processor 208 of FIG. 2 can determine workload types of the one or more sample IO workloads. Further, at 406, the method 400 can include generating the IO workload using the one or more sample IO workloads.

Additionally, at 408, the method 400 can include processing the IO workload using the virtual storage array. For example, the IO processor 208 of FIG. 2 can process the IO workload using the virtual storage array. Further, the method 400, at 410, can include identifying the IO workload's maximum IOs per second (IOPS). For example, the simulator 210 of FIG. 2 can identify the IO workload's maximum IOs per second (IOPS).

Further, the method 400, at 412, can also include analyzing one or more of the IO workload's IO requests. For example, the simulator 210 of FIG. 2 can analyze one or more of the IO workload's IO requests. Additionally, at 414, the method 400 can also include determining a current IOPS and related metrics of the IO workload. For example, the simulator 210 of FIG. 2 can determine a current IOPS and related metrics of the IO workload.

In addition, the method 400, at 416, can include measuring a current RT of the IO workload based on analysis and workload type results. Specifically, the method 400 can include determining the current RT using an inverse distance weighting interpolation (IDW) engine to process the analysis results and workload type. For example, the simulator 210 of FIG. 2 can measure a current RT of the IO workload based on analysis and workload type results using an inverse distance weighting interpolation (IDW) engine to process the analysis results and workload type. Additionally, at 418, the method 400 can include predicting RTs corresponding to one or more anticipated IO workloads for one or more storage array hardware configurations based on one or more current RT measurements. For example, the prediction processor 214 of FIG. 2 can predict RTs corresponding to one or more anticipated IO workloads for one or more storage array hardware configurations based on one or more current RT measurements.

Furthermore, some of the depicted operations can be performed in parallel or in a different sequence that does not materially affect the function of the method 400. In other examples, different components of the storage array 102 that implements the method 400 can perform functions at substantially the same time or in a specific sequence.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer having a display device that enables user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
generating a storage array configuration based on one or more array-configuration-related parameters;
recording IO workload metrics corresponding to an IO workload received by an array corresponding to the storage array configuration;
generating at least one response time (RT) prediction based on the IO workload metrics;
generating another storage array configuration based on the at least one RT prediction and according to performance requirements defined by a service level objective (SLO);
analyzing the IO workload's IO types, IO sizes, and IO compression states;
determining a workload type of the IO workload; and
measuring a current RT of the IO workload based on results of the analysis and workload type, wherein determining the current RT includes using an inverse distance weighting interpolation (IDW) engine to process the analysis results and workload type.

2. The method of claim 1, further comprising:
generating a virtual storage array based on the storage array configuration;
obtaining one or more sample IO workloads with measured RT results from a physical storage array having a deployed configuration similar to the virtual storage array's configuration; and
determining workload types of the one or more sample IO workloads.

3. The method of claim 2, further comprising:
generating the IO workload using the one or more sample IO workloads;
processing the IO workload using the virtual storage array; and
identifying the IO workload's maximum IOs per second (IOPS); and
analyzing one or more of the IO workload's IO requests.

4. The method of claim 3, further comprising:
determining at least one or more IO types, IO sizes, and IO compression states corresponding to the IO workload's IO requests.

5. The method of claim 3, further comprising:
determining a current IOPS and related metrics of the IO workload.

6. The method of claim 1, further comprising:
measuring the current RT when the IO workload's current IOPS reaches one or more threshold percentiles of the IO workload's maximum IOPS.

7. The method of claim 6, further comprising:
predicting RTs corresponding to one or more anticipated IO workloads for one or more storage array hardware configurations based on one or more current RT measurements.

8. The method of claim 7, further comprising:
determining an IOPS growth factor based on the IO workload metrics, type, and IO workload analysis; and
determining the IO workload's current IOPS percentile of its maximum IOPS using the IOPS growth factor.

9. The method of claim 8, further comprising:
determining when one or more of the storage array's components reach 100% utilization.

10. A system with a processor and memory, the system configured to:
generate a storage array configuration based on one or more array-configuration-related parameters;
record IO workload metrics corresponding to an IO workload received by an array corresponding to the storage array configuration;
generate at least one response time (RT) prediction based on the IO workload metrics;
generate another storage array configuration based on the at least one RT prediction and according to performance requirements defined by a service level objective (SLO));
analyze the IO workload's IO types, IO sizes, and IO compression states;
determine a workload type of the IO workload; and
measure a current RT of the IO workload based on results of the analysis and workload type, wherein determining the current RT includes using an inverse distance weighting interpolation (IDW) engine to process the analysis results and workload type.

11. The system of claim 10, further configured to:
generate a virtual storage array based on the storage array configuration;
obtain one or more sample IO workloads with measured RT results from a physical storage array having a deployed configuration similar to the virtual storage array's configuration; and
determine workload types of the one or more sample IO workloads.

12. The system of claim 11, further configured to:
generate the IO workload using the one or more sample IO workloads;
process the IO workload using the virtual storage array; and
identify the IO workload's maximum IOs per second (IOPS); and
analyze one or more of the IO workload's IO requests.

13. The system of claim 12, further configured to:
determine at least one or more IO types, IO sizes, and IO compression states corresponding to the IO workload's IO requests.

14. The system of claim 12, further configured to:
determine a current IOPS and related metrics of the IO workload.

15. The system of claim 10, further configured to:
measure the current RT when the IO workload's current IOPS reaches one or more threshold percentiles of the IO workload's maximum IOPS.

16. The system of claim 15, further configured to:
predict RTs corresponding to one or more anticipated IO workloads for one or more storage array hardware configurations based on one or more current RT measurements.

17. The system of claim 16, further configured to:
determine an IOPS growth factor based on the IO workload metrics, type, and IO workload analysis; and
determine the IO workload's current IOPS percentile of its maximum IOPS using the IOPS growth factor.

18. The system of claim 17, further configured to:
determine when one or more of the storage array's components reach 100% utilization.

* * * * *